(12) United States Patent
Kagami et al.

(10) Patent No.: US 8,174,345 B2
(45) Date of Patent: May 8, 2012

(54) VIBRATION GENERATOR

(75) Inventors: Masaharu Kagami, Tama (JP); Kazutaka Sakaguchi, Tama (JP); Yuki Takahashi, Sagamihara (JP); Shigenori Inamoto, Sagamihara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 85 days.

(21) Appl. No.: 12/867,961

(22) PCT Filed: Feb. 4, 2009

(86) PCT No.: PCT/JP2009/051895
§ 371 (c)(1),
(2), (4) Date: Aug. 17, 2010

(87) PCT Pub. No.: WO2009/104476
PCT Pub. Date: Aug. 27, 2009

(65) Prior Publication Data
US 2010/0315185 A1    Dec. 16, 2010

(30) Foreign Application Priority Data

Feb. 20, 2008 (JP) ................................. 2008-038745

(51) Int. Cl.
*H01F 7/10* (2006.01)
(52) U.S. Cl. .......... 335/252; 335/90; 335/222; 335/229; 335/235; 335/248; 335/296; 381/396; 310/15
(58) Field of Classification Search .................. 335/252, 335/87, 90, 222, 223, 229, 235, 248, 277, 335/296, 302–306; 381/396–422; 310/17, 310/15, 12.04, 25, 30
See application file for complete search history.

(56) References Cited

U.S. PATENT DOCUMENTS
2002/0008602 A1* 1/2002 Kyouno et al. ............... 335/220
(Continued)

FOREIGN PATENT DOCUMENTS
JP          5-232265 A      9/1993
(Continued)

OTHER PUBLICATIONS
International Search Report dated Mar. 31, 2009 issued in International Appln. No. PCT/JP2009/051895.

*Primary Examiner* — Mohamad Musleh
(74) *Attorney, Agent, or Firm* — Holtz, Holtz, Goodman & Chick, P.C.

(57) ABSTRACT

A vibration generator 1 has an attachment structure of a spring by which the attachment error of the spring elastically supporting a mover composed of a magnet and a yoke does not become the error of the span of the spring to make it possible to improve the ease and yield of manufacture. The vibration generator 1 includes a mover which is composed of a magnet 5 and yokes 4, 7a and 7b, and a spring 6 which is composed of an integrally molded article made of an elastomeric material and elastically supports the mover to allow the mover to vibrate in the central axis direction C. The spring is arranged on the outside of a coil 3 in a radial direction thereof and extends along the radial direction. An outer end portion 6a in the radial direction is nipped by two parts 2 and 8 in the central axis direction to be fixed to the housings 2 and 8, and an inner end portion 6b in the radial direction is nipped by two parts 7a and 7b constituting the outer circumferential part of the yoke in the central axis direction to be fixed to the outer circumferential part of the yoke. The outer end portion and the inner end portion have projecting parts formed to project from an elastic deformation section 6c, connecting the outer end portion and the inner end portion to each other, into two directions along the central axis.

10 Claims, 4 Drawing Sheets

U.S. PATENT DOCUMENTS

| | | |
|---|---|---|
| 2002/0027491 A1 | 3/2002 | Kim |
| 2004/0150277 A1* | 8/2004 | Moriyasu .................. 310/81 |
| 2005/0285454 A1* | 12/2005 | Choi et al. .................. 310/14 |
| 2009/0184589 A1* | 7/2009 | Yamagishi ............. 310/12.16 |

FOREIGN PATENT DOCUMENTS

| | | |
|---|---|---|
| JP | 09-205763 A | 8/1997 |
| JP | 10-229596 A | 8/1998 |
| JP | 2002-112385 A | 4/2002 |
| JP | 3375233 A | 11/2002 |
| JP | 2003-009495 A | 1/2003 |
| JP | 2004-186912 A | 7/2004 |
| JP | 2006-281170 A | 10/2006 |
| WO | WO 2009014184 A1 * | 1/2009 |

* cited by examiner

VIBRATION GENERATOR

This application is a U.S. National Phase Application under 35 USC 371 of International Application PCT/JP2009/051895 filed Feb. 4, 2009.

TECHNICAL FIELD

The present invention relates to a vibration generator.

BACKGROUND ART

A vibration generator has recently been used in a portable terminal, such as a cellular phone handset and a personal digital assistant (PDA), operation equipment, such as a controller for a game, and the like.

As the vibration generators for such a use, ones having the following configurations and operation are used, as also shown in Patent Documents 1 and 2.

That is, a vibration generator is made up of a first mover composed of a magnet supported by a plate spring and a yoke, and a stator composed of a coil fixed to a housing, or a second mover composed of a coil fixed on a vibrating plate in place of the stator.

Then, the first mover generates vibrations and the second mover generates sounds by the operation of magnetic force generated by the magnet and electromagnetic force generated by a current flowing through the coil.

This kind of vibration generator has conventionally adopted a system of resonating a vibration system, composed of a plate spring and a mover, by electrifying the coil with almost the same frequency as the resonance frequency of the vibration system (Patent Document 3). The frequency characteristic of a vibration generator is generally shown by an acute curve having a peak at a resonance frequency, and large vibration force can be obtained at the resonance frequency but the obtained vibration force becomes weaker as the input frequency deviates from the resonance frequency.

On the other hand, as described in Patent Documents 1 and 4, as the structure for fixing a plate spring to a housing (case), a structure of fixing the outer end portion of the plate spring by nipping the outer end portion with two parts of the case is sometimes adopted. Furthermore, in Patent Documents 1 and 4, the plate spring is fixed in such a way that the central part (inner circumferential part) thereof is superposed on the center of the yoke.

In recent years, devices on which vibration generators are installed have been miniaturized and thinned, and the vibration generators themselves have also been desired to be miniaturized and thinned.

Patent Document 1: Japanese Patent Publication No. 3375233
Patent Document 2: Japanese Patent Application Laid-Open Publication No. 2003-9495
Patent Document 3: Japanese Patent Application Laid-Open Publication No. H9-205763
Patent Document 4: Japanese Patent Application Laid-Open Publication No. H10-229596

DISCLOSURE OF INVENTION

Problems to Be Solved by the Invention

According to the research by the inventors of the present application, it is necessary to increase the attenuation rate of a spring supporting a mover composed of a magnet and a yoke, in order to widen the band of strong vibration force for enabling the drive of a vibration generator in a wide band. As a measure of increasing the attenuation rate, it is effective to use an elastomeric material as the spring and to select the material and the size thereof.

It is sometimes necessary to form the spring to be thick in order to obtain a desired spring characteristic, but if the plate spring is fixed by being superposed at the center of the yoke like a conventional way, it would go against making the device thinner. In order to keep the thinness of the device or make the device thinner, it is effective to arrange the spring within the thickness of the yoke by making the inner end portion of the spring adjoin the outer circumferential part of the yoke and fixing them. On the other hand, it is, however, necessary to shorten the span of the spring in order to avoid the device becoming large in size.

Under the situations described above, it is considered necessary to form the spring to be thick and short.

On the other hand, the following problem exists in the case of adopting the structure of fixing an end of a plate spring by nipping the end with two parts: if an error of the nipping position is caused, the error directly becomes the error of the span of the spring, and the characteristic of the spring, i.e. the vibration characteristic thereof, becomes different from product to product. If a short spring is selected, the problem becomes remarkable.

The present invention was made in view of the problem of the prior art mentioned above, and aims to provide a vibration generator having an attachment structure of a spring by which the attachment error of the spring elastically supporting a mover composed of a magnet and a yoke does not become the error of the span of the spring to make it possible to improve the ease and yield of manufacture.

Means for Solving Problems

In order to solve the problems described above, a vibration generator according to a first aspect of the present invention includes, a coil fixed to a vibrating plate or the like at one end thereof in a central axis direction of the coil, a mover facing to the coil from an other end of the coil and vibrating in the central axis direction, the mover composed of a magnet and a yoke, a spring elastically supporting the mover to allow the mover to vibrate in the central axis direction, and a housing housing the coil, the mover, and the spring therein, wherein a part of the yoke constitutes an outer circumferential part of the yoke, the outer circumferential part arranged on an outside of the coil in a radial direction thereof, the spring is arranged on the outside of the coil in the radial direction and extends along the radial direction, an outer end portion in the radial direction of the spring nipped by two parts in the central axis direction to be fixed to the housing, and an inner end portion in the radial direction of the spring fixed to the outer circumferential part of the yoke, and the outer end portion includes projecting parts formed to project from an elastic deformation section, connecting the outer end portion and the inner end portion to each other, into two directions along the central axis.

A vibration generator according to a second aspect of the present invention comprises a coil fixed to a vibrating plate or the like at one end thereof in a central axis direction of the coil, a mover facing to the coil from an other end of the coil and vibrating in the central axis direction, the mover composed of a magnet and a yoke, a spring elastically supporting the mover to allow the mover to vibrate in the central axis direction, and a housing housing the coil, the mover, and the spring therein, wherein a part of the yoke constitutes an outer circumferential part of the yoke, the outer circumferential part arranged on an outside of the coil in a radial direction thereof, the spring is arranged on the outside of the coil in the radial direction and extends along the radial direction, an outer end portion in the radial direction of the spring fixed to the housing, and an inner end portion in the radial direction of the spring nipped by two parts constituting the outer circumferential part of the yoke in the central axis direction to be fixed to the outer circumferential part of the yoke, and the inner end portion includes projecting parts formed to project from an elastic deformation section, connecting the outer end portion and the inner end portion to each other, into two directions along the central axis.

The vibration generator according to a third aspect of the present invention comprises the vibration generator according to the first aspect of the present invention, wherein the inner end portion is nipped by two parts constituting the outer circumferential part of the yoke in the central axis direction to be fixed to the outer circumferential part of the yoke, and the inner end portion includes projecting parts formed to project from the elastic deformation section into two directions along the central axis.

The vibration generator according to a fourth aspect of the present invention comprises the vibration generator according to the third aspect of the present invention, wherein the outer end portion and the inner end portion are severally formed in a ring including the projecting parts thereof.

The vibration generator according to a fifth aspect of the present invention comprises the vibration generator according to the fourth aspect of the present invention, wherein the elastic deformation section is formed in a continuous ring over a round between the outer end portion and the inner end portion.

The vibration generator according to a sixth aspect of the present invention comprises the vibration generator according to any one of the first through fifth aspects of the present invention, wherein the spring is composed of an integrally molded article made of an elastomeric material.

Effects of the Invention

According to the present invention, a part nipping the fixed end of a spring abuts against projecting parts to be separated from an elastic deformation section. Consequently, even if an error of a position at which the spring elastically supporting a mover is fixed by being nipped is caused, the error does not become the error of the span of the spring, and the uniform characteristic of the spring that is not affected by any assembly errors, i.e. a uniform vibration characteristic, can easily be secured.

Consequently, according to the present invention, the vibration generator has an attachment structure of a spring that does not make an attachment error of the spring, elastically supporting a mover composed of a magnet and a yoke, an error of the span of the spring, and the vibration generator has an effect of being able to improve the ease and yield of manufacture of the device.

According to the invention of claim 1, the aforesaid effect can be obtained on fixing the spring to a housing.

According to the invention of claim 2, the aforesaid effect can be obtained on fixing the spring to a mover.

According to the invention of claim 3, the aforesaid effect can be obtained on fixing the spring to the housing and fixing the spring to the mover.

According to the invention of claim 4, the spring can be fixed by being nipped over a round to keep the retentivity of the spring in a good state.

According to the invention of claim 5, a short and strong spring can be configured, and the spring fits to widen the band of strong vibration force and miniaturize the device.

According to the invention of claim 6, a strong spring having projecting parts at an end thereof can easily be con-figured, and the uniformization of the spring can easily be achieved by accurate molding.

BEST MODE FOR CARRYING OUT THE INVENTION

Figure 1:
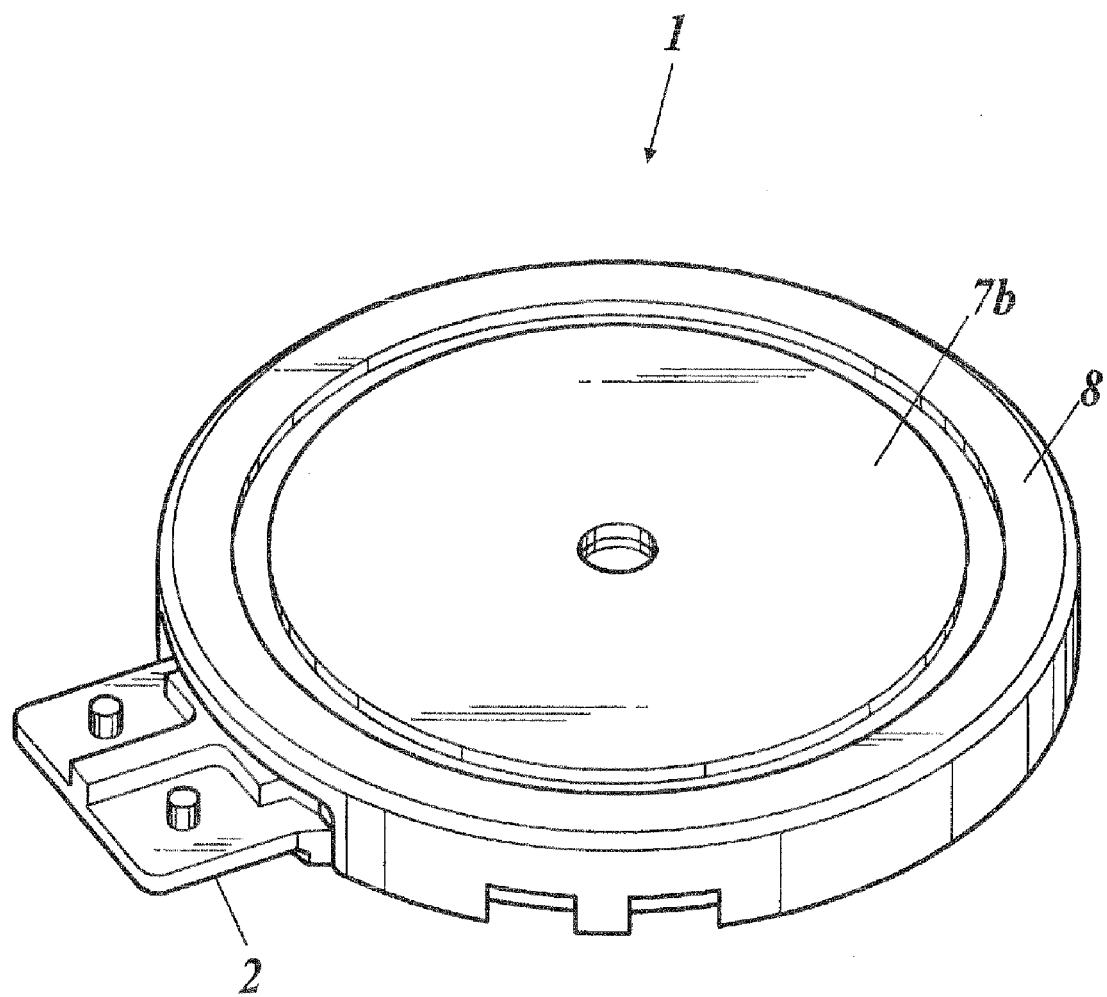
FIG. 1 is a perspective view of a vibration generator according to an embodiment of the present invention.
Figure 2:
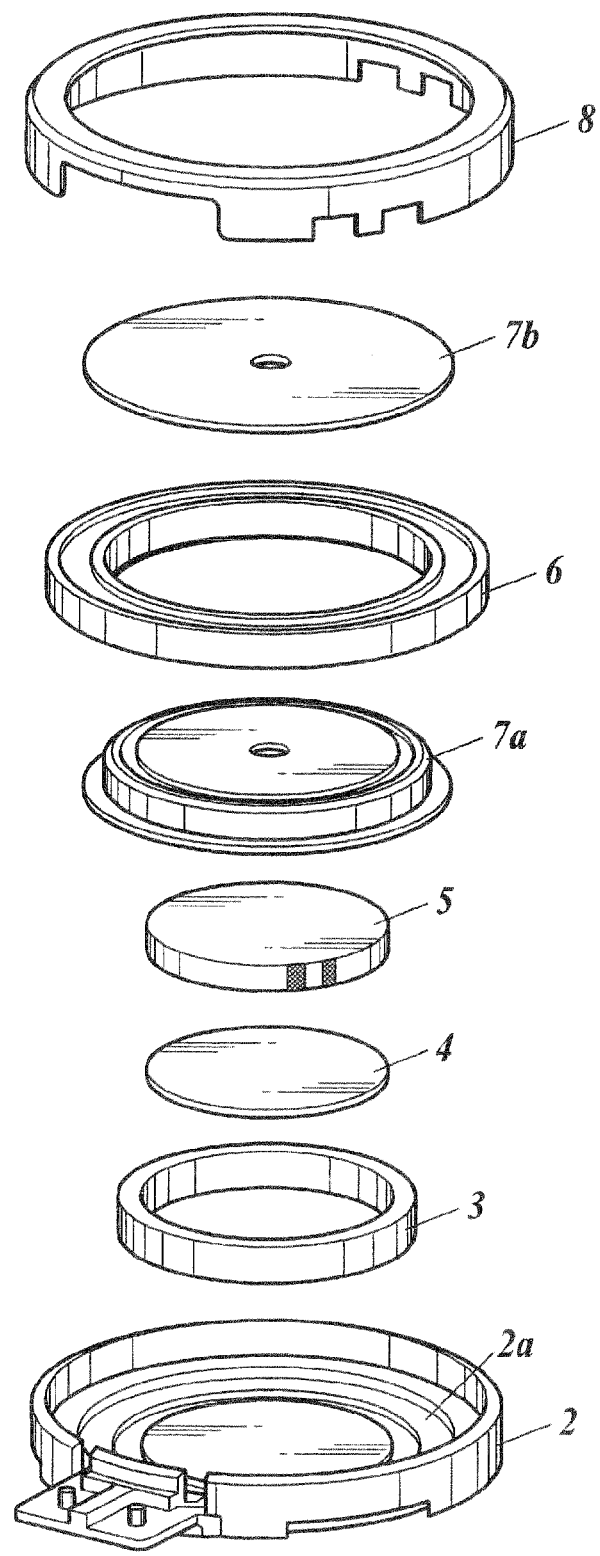
FIG. 2 is an exploded perspective view of the vibration generator according to the embodiment of the present invention.
Figure 3A:
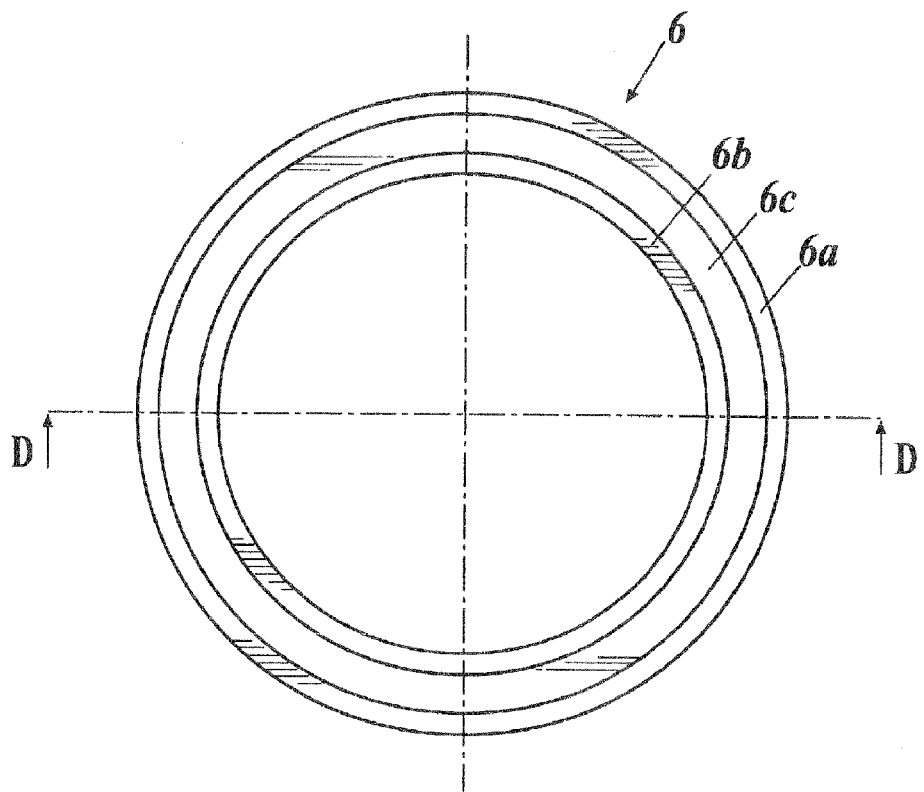
FIG. 3A is a plan view of a spring used for the vibration generator according to the embodiment of the present invention.
Figure 3B:
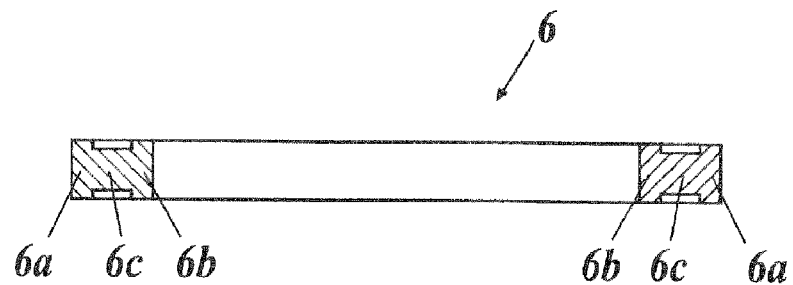
FIG. 3B is a sectional view taken along a line D-D in FIG. 3A.
Figure 4:
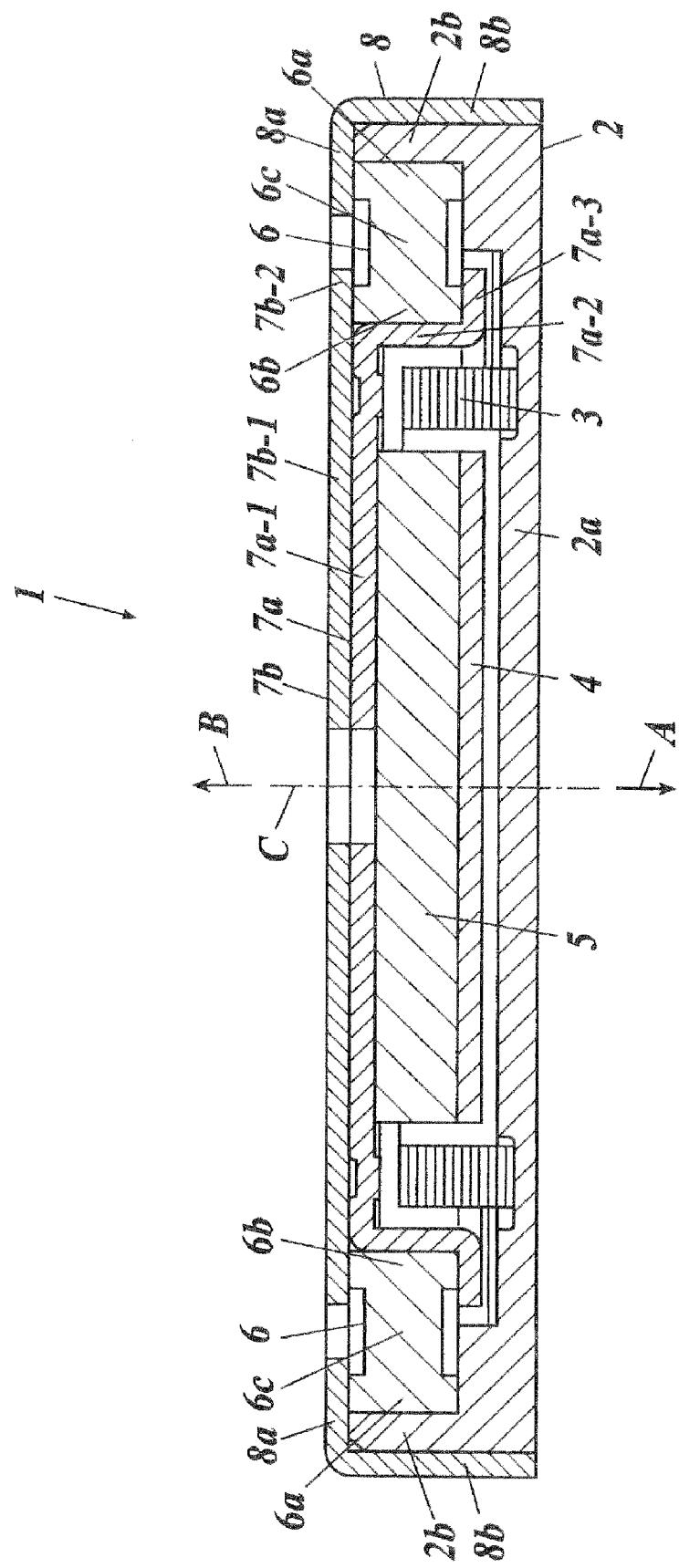
FIG. 4 is a vertical sectional view of the vibration generator according to the embodiment of the present invention.

In the following, an embodiment of the present invention will be described with reference to the accompanying drawings. The following is only one embodiment of the present invention and does not limit the scope of the present invention. FIG. 1 is a perspective view of a vibration generator according to the embodiment of the present invention. FIG. 2 is an exploded perspective view of the vibration generator according to the embodiment of the present invention. FIG. 3A is a plan view of a spring used for the vibration generator according to the embodiment of the present invention. FIG. 3B is a sectional view taken along a line D-D in FIG. 3A. FIG. 4 is a vertical sectional view of the vibration generator according to the embodiment of the present invention.

As shown in FIGS. 1 and 2, the vibration generator 1 of the present embodiment is equipped with a base housing 2, a coil 3, a center yoke 4, a magnet 5, a spring 6, a first outer yoke 7a, a second outer yoke 7b, and a cover housing 8. The center yoke 4, the magnet 5, and the outer yokes 7a and 7b constitute a mover. The spring 6 is composed of an integrally molded article of an elastomeric material.

The coil 3 is configured as a stator. The coil 3 is fixed in the center of a circular plate member 2a of the base housing 2. The circular plate member 2a may be supported to be movable with respect to the housing main body in order that the circular plate member 2a may become a vibrating plate. In this case, the coil 3 becomes the aforesaid second mover.

As shown in FIGS. 2 and 4, each section is formed in a circle, and is concentrically arranged around the central axis C of the coil 3. One end side at which the coil 3 is fixed, is denoted by an arrow A, and the other end side thereof is denoted by an arrow B along the central axis C.

The mover, composed of the center yoke 4, the magnet 5, and the outer yokes 7a and 7b, is arranged to face to the coil 3 from the other end side (B side) thereof. The spring 6 elastically supports this mover to allow the mover to vibrate in the direction of the central axis C.

The center yoke 4 and the magnet 5 are severally formed in a disk or a column, having a diameter that is smaller than the inner diameter of the coil 3 and that is almost the same as each other. The central parts 7a-1 and 7b-1 of the outer yokes 7a and 7b, respectively, are formed in disks severally larger than the outer diameter of the coil 3. One end side (A side) and the other end side (B side) of the magnet 5 constitute opposite magnetic poles. The center yoke 4 is joined to one end side (A side) of the magnet 5. The central part 7a-1 of the first outer yoke 7a is joined to the other end side (B side) of the magnet 5. The central part 7*b*-1 of the second outer yoke 7*b* is joined to the other end side (B side) of the central part 7*a*-1 of the first outer yoke 7*a*.

The outer circumferential part of the yoke is composed of the peripheral wall section 7*a*-2 and the flange section 7*a*-3 of the first outer yoke 7*a*, and the outer circumferential part 7*b*-2 of the second outer yoke 7*b*.

The first outer yoke 7*a* has a structure in which the inner circumferential edge of the flange section 7*a*-3 is joined to the one end side (A side) of the peripheral wall section 7*a*-2 and the outer circumferential edge of the central part 7*a*-1 is joined to the other end side (B side) of the peripheral wall section 7*a*-2.

The second outer yoke 7*b* is wholly formed in a disk, and, of the second outer yoke 7*b*, the range within the outer diameter of the peripheral wall section 7*a*-2 is referred to as the central part 7*b*-1, and the part projecting to the outward of the peripheral wall section 7*a*-2 is referred to as the outer circumferential part 7*b*-2, for convenience of description.

The center yoke 4 is arranged on the inside of the coil 3 in the radial directions thereof. On the other hand, the outer circumferential parts of the yoke 7*a*-2, 7*a*-3, and 7*b*-2 are arranged on the outside of the coil 3 in the radial directions thereof.

The spring 6 is arranged on the outside of the coil 3 in the radial directions thereof, and extends along the radial directions.

The base housing 2 includes a peripheral wall section 2*b*. The cover housing 8 includes a top plate section 8*a* and a peripheral wall section 8*b*. The peripheral wall section 8*b* of the cover housing 8 has an inner diameter almost the same as the outer diameter of the peripheral wall section 2*b* of the base housing 2, and is fit onto the outside of the peripheral wall section 2*b* of the base housing 2. The outer circumferential edge of the top plate section 8*a* of the cover housing 8 is joined to the other end side (B side) of the peripheral wall section 8*b* of the cover housing 8. The top plate section 8*a* of the cover housing 8 includes a central opening having an inner diameter larger than the outer diameter of the second outer yoke 7*b*, and the second outer yoke 7*b* is arranged in this central opening. The top plate section 8*a* is arranged on the outside of the second outer yoke 7*b* with an interval between the top plate section 8*a* and the second outer yoke 7*b*, separating them from each other in the radial directions.

As shown in FIGS. 3A and 3B, the spring 6 is a ring-shaped plate spring, in which an outer end portion 6*a* thereof and an inner end portion 6*b* thereof are severally formed in a ring and are arranged with an interval between them separating them from each other in the radial directions. That is, the inner diameter of the outer end portion 6*a* is formed to be larger than the outer diameter of the inner end portion 6*b*, and thereby both of the outer end portion 6*a* and the inner end portion 6*b* are separated from each other in the radial directions with the interval between them. An elastic deformation section 6*c* is arranged in the interval to connect the outer end portion 6*a* and the inner end portion 6*b* to each other. The elastic deformation section 6*c* is formed in a continuous ring over a round between the outer end portion 6*a* and the inner end portion 6*b*. That is, no lacked parts, such as a spiral groove, are formed in the elastic deformation section 6*c*. A compact ring-shaped plate spring, in which the distance between the outer end portion 6*a* thereof and the inner end portion 6*b* thereof is short, can be formed by using this spring 6.

The outer end portion 6*a* has projecting parts formed to project from the elastic deformation section 6*c* into two directions along the central axis C. That is, the projecting parts indicate both of the projecting part projecting into the one end side (A side) and the projecting part projecting into the other end side (B side).

The inner end portion 6*b* has projecting parts formed to project from the elastic deformation section 6*c* into two directions along the central axis C. That is, the projecting parts indicate both of the projecting part projecting into the one end side (A side) and the projecting part projecting into the other end side (B side).

The outer end portion 6*a* of the spring 6 is nipped into the direction of the central axis C by two parts, i.e. by the base housing 2 and the cover housing 8 in the present embodiment, to be fixed to the housings 2 and 8. As shown in FIG. 4, the outer end portion 6*a* of the spring 6 is nipped by the circular plate member 2*a* of the base housing 2 and the top plate section 8*a* of the cover housing 8 to be fixed.
The parts (2 and 8) nipping the outer end portion 6*a* of the spring 6 are separated from the elastic deformation section 6*c* by abutting against the projecting parts of the outer end portion 6*a*.

Consequently, even if a positional misalignment exists between the outer end portion 6*a* of the spring 6 and the base housing 2 or the cover housing 8 in the radial directions, the supporting state of the outer end portion 6*a* of the spring 6 does not change, and no changes are caused in the span of the spring 6.

In addition, the projection heights of the projecting parts of the outer end portion 6*a* are designed so that the parts (2 and 8) nipping the projecting parts may not contact with the elastic deformation section 6*c* even at the maximum amplitude of the present vibration generator 1 at the time of use.

The inner end portion 6*b* of the spring 6 is nipped into the direction of the central axis C by two parts constituting the outer circumferential part of the yoke, i.e. by the first outer yoke 7*a* and the second outer yoke 7*b* in the present embodiment, to be fixed to the outer circumferential part of the yoke. As shown in FIG. 4, the inner end portion 6*b* of the spring 6 is nipped by the flange section 7*a*-3 of the first outer yoke 7*a* and the outer circumferential part 7*b*-2 of the second outer yoke 7*b* to be fixed therebetween. The parts (7*a* and 7*b*) nipping the inner end portion 6*b* of the spring 6 are separated from the elastic deformation section 6*c* by abutting against the projecting parts of the inner end portion 6*b*.

Consequently, even if a positional misalignment exists between the inner end portion 6*b* of the spring 6 and the first outer yoke 7*a* or the second outer yoke 7*b* in the radial directions, the supporting state of the inner end portion 6*b* of the spring 6 does not change, and no changes are caused in the span of the spring 6.

In addition, the projection heights of the projecting parts of the inner end portion 6*b* are designed so that the parts (7*a* and 7*b*) nipping the projecting parts may not contact with the elastic deformation section 6*c* even at the maximum amplitude of the present vibration generator 1 at the time of use.

The present vibration generator 1 has the configuration described above. When driving power is input into the coil 3, the mover, composed of the center yoke 4, the magnet 5, and the outer yokes 7*a* and 7*b*, vibrates into the direction of the central axis C.

According to the vibration generator 1 of the present embodiment described above, even if an error of a position at which the spring elastically supporting the mover is fixed by being nipped is caused, the error does not become the error of the span of the spring, and the uniform characteristic of the spring that is not affected by any assembly errors, i.e. a uniform vibration characteristic, can easily be secured.

Consequently, according to the vibration generator 1 of the present embodiment, the vibration generator 1 has an attachment structure of a spring that does not make an attachment error of the spring, elastically supporting the mover composed of the magnet and the yoke, an error of the span of the spring, and the vibration generator 1 has an effect of being able to improve the ease and yield of manufacture of the device.

According to the vibration generator 1 of the present embodiment, the aforesaid effect can be obtained on fixing the spring to the housing and fixing the spring to the mover.

Industrial Applicability

The vibration generator of the present invention can be used as a generating device of a vibration and a sound. For example, the vibration generator can be used as vibration generators installed in mobile communication equipment, such as a cellular phone handset, amusement equipment, such as a controller for a game, a touch panel type information inputting device, and the like, and as a sound generating source of a sound outputting device.

REFERENCE NUMERALS

1 vibration generator
2 base housing
2a circular plate member
3 coil
4 center yoke
5 magnet
6 spring
6a outer end portion
6b inner end portion
6c elastic deformation section
7a first outer yoke
7b second outer yoke
8 cover housing
C central axis

The invention claimed is:

1. A vibration generator, comprising:
a coil fixed to a plate member at one end thereof in a central axis direction of the coil;
a mover which faces the coil from another end of the coil, and which is vibratable in the central axis direction, the mover comprising a magnet and a yoke;
a spring elastically supporting the mover to allow the mover to vibrate in the central axis direction, the spring being arranged on an outside of the coil in a radial direction thereof and extending along the radial direction, and the spring comprising an outer end portion and an inner end portion in the radial direction, and an elastic deformation section connecting the outer end portion and the inner end portion to each other; and
a housing which houses the coil, the mover, and the spring therein,
wherein:
an outer circumferential part of the yoke is arranged on the outside of the coil in the radial direction; the outer end portion of the spring is nipped by two parts in the central axis direction to be fixed to the housing, and the inner end portion of the spring is fixed to the outer circumferential part of the yoke; and
the outer end portion includes projecting parts formed to project from the elastic deformation section into two directions along the central axis.

2. A vibration generator, comprising:
a coil fixed to a plate member at one end thereof in a central axis direction of the coil;
a mover which faces the coil from another end of the coil, and which is vibratable in the central axis direction, the mover comprising a magnet and a yoke;
a spring elastically supporting the mover to allow the mover to vibrate in the central axis direction, the spring being arranged on an outside of the coil in a radial direction thereof and extending along the radial direction, and the spring comprising an outer end portion and an inner end portion in the radial direction, and an elastic deformation section connecting the outer end portion and the inner end portion to each other; and
a housing which houses the coil, the mover, and the spring therein,
wherein:
an outer circumferential part of the yoke is arranged on the outside of the coil in the radial direction, the outer circumferential part of the yoke including two parts;
the outer end portion of the spring is fixed to the housing, and the inner end portion of the spring is nipped by two parts constituting the outer circumferential part of the yoke in the central axis direction to be fixed to the outer circumferential part of the yoke; and
the inner end portion includes projecting parts formed to project from the elastic deformation section into two directions along the central axis.

3. The vibration generator according to claim 1, wherein:
the outer circumferential part of the yoke comprises two parts, and the inner end portion is nipped by the two parts of the outer circumferential part of the yoke in the central axis direction to be fixed to the outer circumferential part of the yoke; and
the inner end portion includes projecting parts formed to project from the elastic deformation section into two directions along the central axis.

4. The vibration generator according to claim 3, wherein the outer end portion and the inner end portion are severally formed in a ring including the projecting parts thereof.

5. The vibration generator according to claim 4, wherein the elastic deformation section is formed in a continuous ring over a round between the outer end portion and the inner end portion.

6. The vibration generator according to claim 1, wherein the spring comprises an integrally molded article made of an elastomeric material.

7. The vibration generator according to claim 2, wherein the spring comprises an integrally molded article made of an elastomeric material.

8. The vibration generator according to claim 3, wherein the spring comprises an integrally molded article made of an elastomeric material.

9. The vibration generator according to claim 4, wherein the spring comprises an integrally molded article made of an elastomeric material.

10. The vibration generator according to claim 5, wherein the spring is composed of an integrally molded article made of an elastomeric material.

* * * * *